May 16, 1933.  F. S. LACK  1,908,988
SERVING TRAY
Filed March 25, 1930
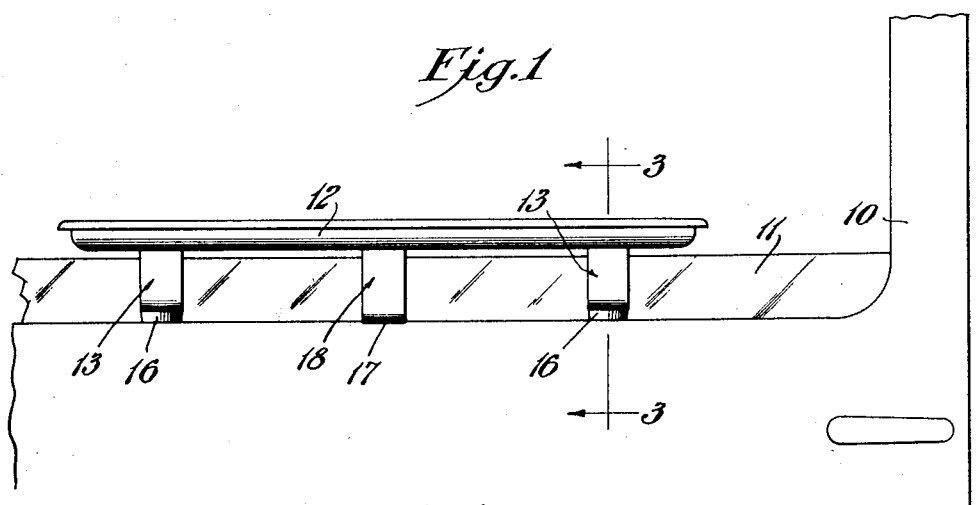
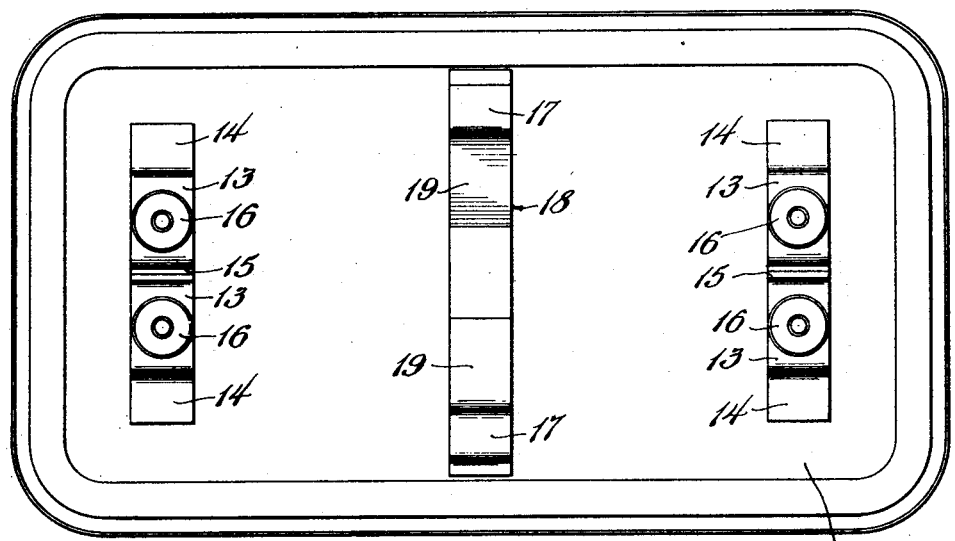
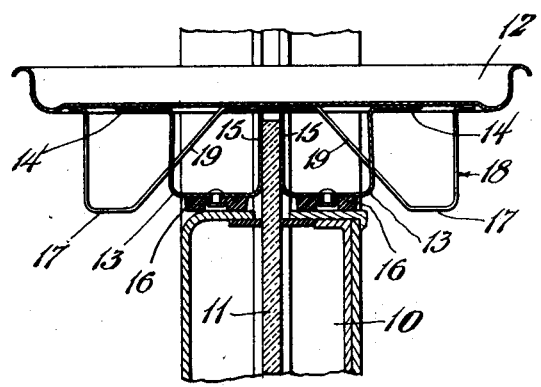
INVENTOR
F. S. Lack
BY
ATTORNEYS Patented May 16, 1933

1,908,988

UNITED STATES PATENT OFFICE

FRED S. LACK, OF PADUCAH, KENTUCKY, ASSIGNOR, BY MESNE ASSIGNMENTS, TO TRAY SERVICE COMPANY, OF DALLAS, TEXAS, A CORPORATION OF TEXAS

SERVING TRAY

Application filed March 25, 1930. Serial No. 438,786.

This invention relates to serving trays of the type intended for "curb service" and aims, among other objects, to provide an improved tray which normally may rest on a flat surface and having novel means whereby it may be stably supported in a vehicle door or window frame when the sash is lowered.

In the drawing,

Fig. 1 is a fragmentary elevation of a vehicle door and showing a tray embodying the invention applied thereto;

Fig. 2 is a bottom plan of the tray, drawn on a larger scale than Fig. 1; and

Fig. 3 is a sectional vew taken on the line 3—3 of Fig. 1 and drawn on the scale of Fig. 2.

Various types of "curb service" trays have been proposed but many of them are provided with more or less complex hand-operated means whereby they may be attached to vehicle doors of various thicknesses or be propped or braced against the sides. The present invention obviates the necessity of such hand-operated mechanisms by providing the tray with means adapted to automatically engage both sides of the upper edges of a sliding window or door glass, while the weight of the tray and its contents may be supported on the door or window ledge. Moreover, the construction and arrangement is such that the tray may be supported entirely by the upper edge of the glass.

Referring particularly to the drawing, the preferred embodiment of the invention is there shown applied to a vehicle door 10 having the usual sliding glass 11. The tray 12, which may be of any suitable size or shape, is herein shown as being rectangular and is preferably made of sheet metal. Secured to the bottom of the tray near each end is a pair of legs or supports 13, each support being in the form of a U-shaped sheet metal member and having an attaching flange 14 at the upper end of one of the legs.

The supports of each pair are shown as extending transversely of the tray, and arranged at opposite sides of the vertical longitudinal axis of the tray with the flanges 14 outermost. These flanges 14 are rigidly secured to the bottom of the tray in any approved manner, as by spot-welding or the like, while the inner adjacent legs 15 are free of the tray bottom so that they may spring outwardly. These legs 15 are shown as being normally spaced apart a distance less than the ordinary window glass of a vehicle, but are adapted to be sprung apart to receive and grip the upper edge of the glass therebetween in order to stabilize the tray. To prevent the supports 13 from marring the car finish, rubber disks or feet 16 are secured to the bottom of the connecting portion of each support 13.

When a tray is to be attached to a vehicle, the window glass 11 is first raised slightly, and the tray is superimposed over the glass so that the legs straddle the upper edge of the glass. When the tray is lowered, the legs 15 are sprung apart by the glass and frictionally grip the opposite sides, while the rubber disks engage the upper face of the door or window ledge to support the weight of the tray, provided, however, that the glass has not been raised far enough to contact with the bottom of the tray.

When the tray is to be detached from the vehicle, it is only necessary to lift it vertically until the legs 15 are disengaged from the glass, or it may be disengaged by merely lowering the glass.

It is to be noted that the supports 13 are necessarily placed close together so as to contact with the comparatively narrow window ledge on each side of the glass, and when the tray is placed on a flat surface, such as a counter or table, to receive glasses, etc. to be carried to a vehicle, the tray might tilt over on one side unless some additional supports are provided. To this end, a pair of legs 17 are provided on the tray near its side edges and intermediate the ends of the tray. The legs are conveniently formed of a bent sheet metal strip or member 18 in the shape of the letter W also conveniently secured to the bottom of the tray by spot-welding or the like.

The bottom of the legs 17 extend below the bottom of the tray substantially the same distance as the bottom of the disks 16 so that the tray will be stably supported on a flat surface, having legs near the ends and the opposite sides. It will be noted in Fig. 3 that the inclined connecting portion 19 of the member 18 between the legs does not interfere with the glass in the vehicle door, or window, and also that the legs 17 are spaced apart a distance greater than the width of the door 10 so that they do not contact with any part of the door. Hence, there is no danger of any part of the member 18 marring the finish of the door.

It will be observed that the tray may be attached to the vehicle door or window with either side extending into the interior of the vehicle. Furthermore, as there are no hand levers or the like to operate, and as a tray will be automatically lowered over the glass due to the weight of the refreshments, etc. thereon, one attendant can readily and easily handle two trays both to and from the vehicle. Moreover, such trays may be manufactured at very low cost, due to the small number of parts, and also, as there are no moving parts to get out of order, the tray will last almost indefinitely. Also, the improved glass gripping members positively prevent the tray from being tilted and spilling the contents of soda glasses, etc. on upholstery or on the clothing of the occupants of a vehicle.

Obviously, the present invention is not restricted to the particular embodiment thereof herein shown and described. Moreover, it is not indispensible that all the features of the invention be used conjointly, since they may be employed advantageously in various combinations and sub-combinations.

What I claim is:—

1. In combination with a tray, a pair of depending U-shaped metal supports at each end of the tray with the legs of each pair substantially in alinement across the tray, the adjacent legs of each pair being adapted to receive and frictionally engage the upper edge of a vehicle window glass therebetween; the other legs of each pair being rigidly secured to the bottom of the tray; and rubber feet on the bottom of the supports adapted to rest on the window ledge.

2. In combination with a serving tray, a pair of resilient metal supports at each end of the tray and adapted to rest on the ledge and also frictionally engage opposite sides of the sliding glass of a vehicle window when it is raised slightly above the ledge; and a support near each side of the tray and between the pairs of end supports to serve with the end supports as legs for the tray when it is placed on a substantially horizontal surface.

3. In combination with a tray, a pair of window glass-gripping legs secured to the bottom of the tray; each of said legs comprising a pair of generally U-shaped resilient, metallic members set close together, so that two legs are adjacent each other but slightly spaced apart, so that said legs must be sprung apart to receive between them the window glass, which is then resiliently gripped; the bottoms of said U-shaped members being adapted to engage the window ledge on each side of the window glass.

4. In combination with a tray, a pair of window glass-gripping legs secured to the bottom of the tray; each of said legs comprising a pair of generally U-shaped resilient, metallic members set close together, so that two legs are adjacent each other but slightly spaced apart, so that said legs must be sprung apart to receive between them the window glass, which is then resiliently gripped; the bottoms of said U-shaped members being adapted to engage the window ledge on each side of the window glass; and an intermediate pair of legs formed from a single piece of metal secured at its ends to the bottom of the tray and also secured thereto at its middle, the two legs formed thereby being spaced well apart to provide a stable base for the tray.

In testimony that I claim the foregoing as my own, I have hereto affixed my signature.

FRED S. LACK.